May 28, 1929.  F. C. CRAWFORD ET AL  1,714,661

PROCESS OF MAKING BALL SEATS

Filed April 24, 1926

INVENTORS:
FREDERICK C. CRAWFORD
MATTHEW P. GRAHAM
BY
ATTORNEY

Patented May 28, 1929.

1,714,661

UNITED STATES PATENT OFFICE.

FREDERICK C. CRAWFORD AND MATTHEW P. GRAHAM, OF DETROIT, MICHIGAN, ASSIGNORS TO THOMPSON PRODUCTS INC., OF CLEVELAND, OHIO, A CORPORATION OF OHIO.

PROCESS OF MAKING BALL SEATS.

Application filed April 24, 1926. Serial No. 104,401.

The invention relates to a process for making ball seats adapted to serve as a bearing member for the ball of a ball stud, such as are commonly used in drag links for automobiles. Such a ball stud consists of a substantially spherical enlargement on the end of a short shank, and, in use, the spherical enlargement engages one or more of such ball seats to serve as a bearing surface therefor.

Heretofore it has been the general practice to make such ball seats on what is commonly known as a screw machine from a solid rod of metal, which necessitates the employment of somewhat costly machinery, consumes considerable time, and results in considerable loss of metal.

It is the object of this invention to simplify the process, speed production, and effect a saving in cost of the articles produced.

Accordingly we construct the article from a metal plate and use such pressing, forging and drawing operations as to leave comparatively little machine work to be done.

The invention consists of the process hereinafter described and claimed by which a steel disk is formed into a ball seat.

In the accompanying drawings, illustrating the steps of our process:

Figure 1:
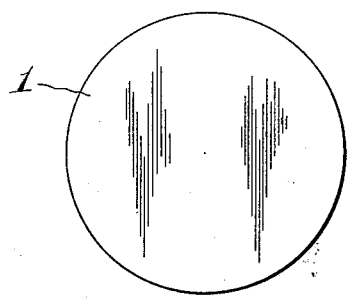
Figure 1 is a plan of a circular disk blank from which the ball seat is made.
Figure 2:
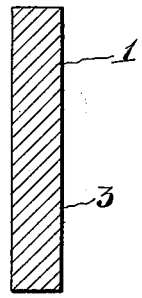
Fig. 2 is a section thereof.
Figure 3:
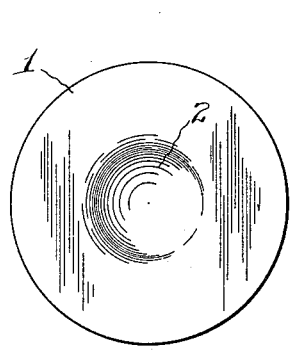
Figs. 3 and 4 are, respectively, a face view and cross section of the blank after completion of the first operation which consists in forming a depression in the center of the blank.
Figure 4:
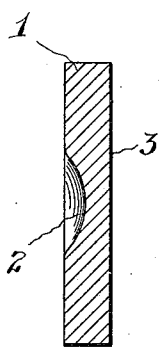
Figure 5:
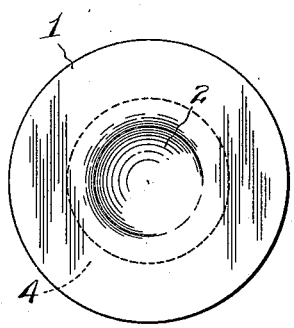
Figs. 5 and 6 are, respectively, a face view and a section of the partially formed blank after completion of the second operation which consists in trimming away an annular portion from the outer margin of the back of the partially formed blank.

Referring to the drawing in detail, in which the same reference numeral is used throughout to designate the same part, the process is begun with a steel disk 1, formed in any well known way, such as by punching from a metal plate. As it is desired to form the metal cold, the plate selected is preferably one made of low carbon annealed steel made especially for heavy pressing or deep drawing work. The first step is to lay the disk 1 on a metal plate or anvil, strike it forcibly with a punch to form a depression or recess 2 centrally of the disk while preserving the general flat form thereof. The form of this recess is such as to form a centering means for a punch in a later operation and it may therefore be of any shape to perform this function, but it is preferably of spherical curvature. It is obvious that the centering recess 2 might be formed simultaneously with the step of punching the disk from the metal stock.

The blank provided with the centering recess 2 is then trimmed away by machining or otherwise at the outer margin of the base 3 of the blank, i. e., the face opposite the recess, as indicated at 4, an annulus of the metal being thus removed and reducing the diameter of such base.

Figure 6:
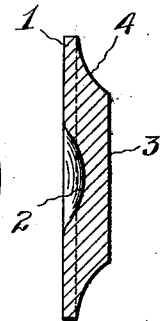
Figure 7:
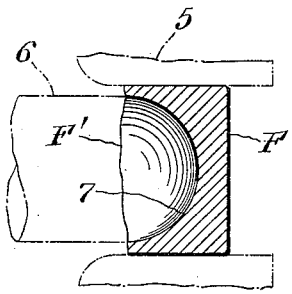
Fig. 7 is a sectional view of a ball seat during the succeeding step which consists in forcing the partially formed blank shown in Fig. 6 through a ring die by means of a punch having a hemispherical end, the die and punch being shown in dotted outlines.
Figure 9:
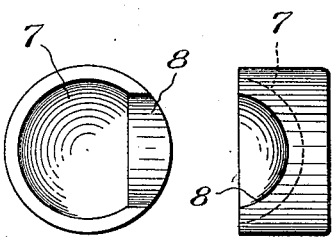
Figs. 9 and 10 are, respectively, a plan view and a side elevation of the ball seat after the succeeding operation, which consists in forming a notch in the wall of the ball seat.
Figure 10:

The base 3 of the blank is then centered over a ring die 5 of less internal diameter than that of the blank as shown in Fig. 7, said diameter being preferably equal to that of the said reduced base 3, and engaged by a punch 6, by which it is forced through the die and formed to proper dimensions on the outside. The punch 6 of less diameter than that of the interior of the die and which has a hemispherical end, as shown in Fig. 7, which forms in the blank a hemispherical recess 7 adapted to provide a bearing surface of proper dimensions for a ball stud. The purpose of trimming the outer margin of the base 3 of the blank, as indicated at 4, is not only to obtain the correct volume of metal to make the product, but to provide a shape which may easily be formed by the ring die and punch. In the operation last referred to the metal undergoes a great change in shape and concurrently suffers a molecular change causing it to harden to such an extent that if further stamping operations were necessary the metal would have to be annealed. Such annealing step is not necessary, however, as the change of the blank from the form shown in Fig. 6 to that shown in Fig. 7, which is the final form, takes place in a single blow. The product which results from the ring die operation may not be perfectly square on the bottom F, and may be rough on the upper edge F′, necessitating a machining operation to square these surfaces with the center line of the bearing.

Instead of the procedure above stated to provide a blank of the form indicated in Fig. 6, we may select a disk 1 of less diameter than that shown in Fig. 1 and form it to the shape in Fig. 6 by pressing or forging the base to the form shown in this figure either before or after the formation of the recess 2 in the face thereof, or the blank might be formed in a single operation. A smaller blank is used when the pressing operation is employed instead of trimming away the outer margin of the base, as by the pressing operation no metal is lost but is caused to flow into the desired shape.

Figure 8:
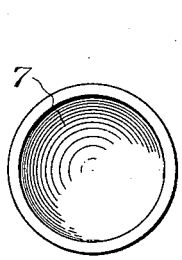
Fig. 8 is a view of a ball seat formed by the step illustrated in Fig. 7 looking toward the bearing recess therein.

The product formed as shown in Figs. 7 and 8, is substantially the same as the product made with the well known screw machine. In order to give the product so formed the hardness and smoothness desirable for a good bearing surface and to enhance its appearance, it is preferable to subject it to the further well known steps of hardening and grinding.

The ball seat as shown in Fig. 7 may be used in situations where the shank of the ball stud projects outwardly or away from the base F; but in many situations it is necessary that the shank of the ball stud shall lie parallel to the base F. In such case it is necessary to perform another operation on the part as shown in Fig. 7, which consists in cutting a semi-circular notch 8 in the wall, to a depth less than the depth of the bearing surface, thereby affording a shoulder to prevent escape of the ball while permitting the shank of the ball stud to extend therethrough.

It will be apparent from the above description, that we have devised a process for making ball seats which will economize material and cheapen the cost of production. The details of the process may be varied without departing from the principles above disclosed. Therefore it is to be understood that our invention is not to be confined to the details disclosed, but includes all departures therefrom falling within the terms of the appended claims.

What we claim is:

1. The process of making a ball seat which consists in taking a flat blank and forming a depression in one face while preserving the general flat form thereof, then removing an annular marginal portion of said blank intersecting the opposite face thereof; and then forcing the resultant blank through a ring-die by means of a spherically curved punch engaging said depression.

2. The process of making a bearing member, which consists in reducing the diameter of a portion of a substantially flat blank, and forcing the blank into a ring-like die having an inside diameter substantially equal to the smallest diameter of said blank whereby the larger portion of said blank is spread transversely to define a substantially semi-circular socket.

3. The process of making a bearing member from a substantially flat disk, which consists in forming a depression in one side of the disk, reducing the diameter of the disk at its other side, and forcing the disk into a ring-like die, having an opening of subtantially the same diameter as said reduced side of the disk, by pressure applied to the side of the disk with the depression.

4. The process of making a bearing member from a substantially flat disk, which consists in forming a depression in one side of the disk, reducing the diameter of the disk at its other side, forcing the disk into a ring-like die, having an opening of substantially the same diameter as said reduced side of the disk, by pressure applied to the side of the disk with the depression, and thereafter forming a transverse notch in the wall of the resultant member shaped to receive the shank of a ball stud.

5. The process of making a bearing member which consists in reducing the diameter of a portion of a substantially flat blank, forcing the blank into a ring-like die having an inside diameter substantially equal to the smallest diameter of said blank whereby the larger portion of said blank is spread transversely to define a substantially semi-circular socket, and thereafter forming a transverse notch in the wall of the resultant member shaped to receive the shank of a ball stud.

6. The process of making a ball seat which consists in reducing the size of the base of a substantially flat blank, thereafter forcing the reduced base of the blank into a ring-like die having an inside diameter less than that of the blank by means of a spherically curved punch engaging that surface of the blank opposite that of the base whereby the said blank is formed to define a substantially semi-circular socket.

7. The process of making a ball seat which consists in forming a substantially semi-circular depression in one side of a substantially flat blank having a base of reduced diameter, and thereafter applying pressure to the side of said blank with said depression by means of a punch having a spherically curved end to force said blank into a ring die having an inside diameter substantially equal to that of said base.

8. The process of making a bearing member which consists in forming a disk with the base of reduced diameter and forcing the disk into a ring-like die having an inside diameter less than that of said disk whereby the larger portion of said disk is spread transversely to define a substantially semi-spherical socket.

9. The process of making a ball seat which consists in forming a disk with a substantially semi-spherical depression on one side and a reduced base on the other side and forming the base of said disk into a ring-like die whereby the portion of said disk about said depression is spread to define a substantially semi-circular socket.

10. The process of making a ball seat which consists in forming a disk with a substantially semi-spherical depression on one side and a reduced base on the other side, forcing the base of said disk into a ring-like die whereby the portion of said disk about said depression is spread to define a substantially semi-circular socket and thereafter forming a transverse notch in the wall of the resultant member shaped to receive the shank of a ball stud.

Signed by us this 16th day of April, 1926.

FREDERICK C. CRAWFORD.
MATTHEW P. GRAHAM.